(12) United States Patent
Yatomi et al.

(10) Patent No.: US 6,288,751 B1
(45) Date of Patent: *Sep. 11, 2001

(54) IMAGE DISPLAY APPARATUS

(75) Inventors: Toshiya Yatomi, Kawasaki; Masahiko Enari, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/582,936

(22) Filed: Jan. 4, 1996

Related U.S. Application Data

(62) Division of application No. 08/434,724, filed on May 4, 1995, now Pat. No. 5,504,536, which is a continuation of application No. 08/221,971, filed on Apr. 4, 1994, now abandoned, which is a continuation of application No. 07/672,125, filed on Mar. 19, 1991, now abandoned.

(30) Foreign Application Priority Data

Mar. 26, 1990 (JP) ................................. 2-077492
Apr. 26, 1997 (JP) ................................. 2-108907

(51) Int. Cl.$^7$ ........................... H04N 5/460; H04N 7/01; H04N 5/445
(52) U.S. Cl. ........................ 348/565; 348/564; 348/563; 348/445
(58) Field of Search .................... 348/565, 564, 348/563, 445

(56) References Cited

U.S. PATENT DOCUMENTS

| | | |
|---|---|---|
| 4,249,211 | 2/1981 | Beba et al. . |
| 4,598,309 | 7/1986 | Casey . |
| 4,670,784 | 6/1987 | Goldberg . |
| 4,982,288 * | 1/1991 | Isobe ...................... 348/565 |
| 4,984,081 | 1/1991 | Miyoshi et al. . |
| 5,040,067 * | 8/1991 | Yamazaki .................. 348/565 |
| 5,065,243 * | 11/1991 | Katagiri ................... 348/565 |
| 5,111,297 * | 5/1992 | Tsuji ..................... 348/565 |

FOREIGN PATENT DOCUMENTS

| | | | |
|---|---|---|---|
| 0072284 | 4/1984 | (JP) . | |
| 0257681 | 12/1985 | (JP) . | |
| 0146672 | 6/1988 | (JP) . | |
| 0263882 | 10/1988 | (JP) | ........... H04N/5/445 |
| 1-155787 | 6/1989 | (JP) . | |
| 0303996 | 12/1989 | (JP) . | |
| 0051984 | 2/1990 | (JP) | ........... H04N/7/010 |
| 2-094781 | 4/1990 | (JP) . | |
| 2-094879 | 4/1990 | (JP) . | |
| 2-097181 | 4/1990 | (JP) . | |
| 0143780 | 6/1990 | (JP) | ........... H04N/5/445 |
| 0149191 | 6/1990 | (JP) | ........... H04N/5/460 |
| 0312369 | 12/1990 | (JP) | ........... H04N/5/460 |
| 4008080 | 1/1992 | (JP) | ........... H04N/5/445 |

* cited by examiner

*Primary Examiner*—Minsun Oh Harvey
(74) *Attorney, Agent, or Firm*—Fitzpatrick, Cella, Harper & Scinto

(57) ABSTRACT

An image display apparatus for displaying an image corresponding to an image signal selectively inputs a first image signal and a second image signal having an aspect ratio different from that of the first image signal. When the second image signal is input, the second image signal is converted into an image signal corresponding to the aspect ratio of the first image signal, and the converted image signal is supplied to an image display unit for displaying an image corresponding to the aspect ratio of the first image signal. Thus, it is possible to display an image in a manner easy to observe, and to effectively utilize the display picture surface.

22 Claims, 5 Drawing Sheets

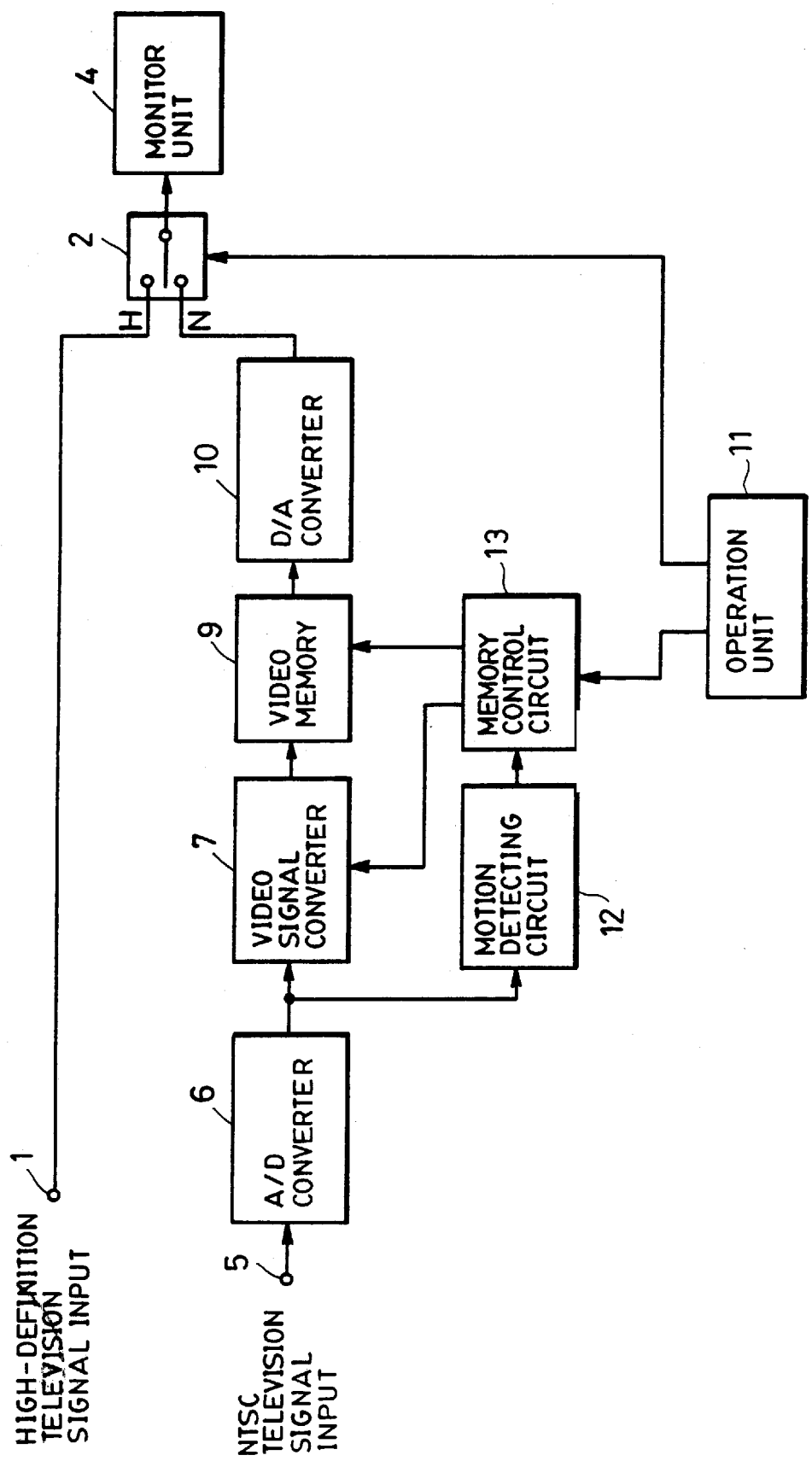

IMAGE DISPLAY APPARATUS

This application is a divisional application of application Ser. No. 08/434,724, filed May 4, 1995, is now U.S. Pat. No. 5,504,536 now allowed, which is a continuation of application Ser. No. 08/221,971, filed Apr. 4, 1994, which is a continuation of application. Ser. No. 07/672,125, filed Mar. 19, 1991, both now abandoned.

BACKGROUND OF THE INVENTION

1. Field of the Invention

This invention relates to an image display apparatus for displaying an image.

2. Description of the Prior Art

Heretofore, when displaying, for example, an image having an NTSC television signal using a television monitor apparatus conforming to a high-definition television system, the signal is supplied to the television monitor apparatus while increasing the number of scanning lines for the NTSC (National Television Systems Committee) television signal so as to conform to the high-definition television system. High definition television is generally recognized as a system which uses an increased number of horizontal lines of resolution per frame to enhance picture quality. Thus, as shown in FIG. 1, an image (reference numeral 21) of the NTSC television signal is displayed on a predetermined position on the picture surface (reference numeral 22) of the television monitor apparatus.

In the above-described conventional method, however, a blank portion on which an image is not displayed is present on the picture surface of the television monitor apparatus, as shown in FIG. 1, due to a difference in aspect ratio between the NTSC system and the high-definition television system. Such a blank portion is very uncomfortable to observe. In addition, the display picture surface of the television monitor apparratus cannot be effectively utilized.

SUMMARY OF THE INVENTION

It is an object of the present invention to provide an image display apparatus which can solve the above-described problems.

It is another object of the present invention to provide an image display apparatus which can display an image in a manner easy to observe.

These objects are accomplished, according to one aspect of the present invention, by an image display apparatus for displaying an image corresponding to an image signal, comprising an image display unit for displaying an image corresponding to an aspect ratio of a first image signal, and an image signal supply means for selectively inputting the first image signal and a second image signal having an aspect ratio different from that of the first image signal, for converting the second image signal into the image signal corresponding to the aspect ratio of the first image signal when the second image signal has been input, and for supplying the image display unit with the converted signal.

It is still another object of the present invention to provide an image display apparatus which can effectively utilize its display picture surface.

This object is accomplished, according to another aspect of the present invention, by an image display apparatus for displaying an image corresponding to an image signal, comprising an image display unit for displaying an image corresponding to an aspect ratio of a first image signal, image signal conversion means for inputting a second image signal having an aspect ratio different from that of the first image signal, and for converting the input second image signal into an image signal corresponding to the aspect ratio of the first image signal, and display control means for controlling the display unit so as to display the image signal formed by the image signal conversion means on a first display picture surface of the image display unit, and to display an image corresponding to another information on a second display picture surface which is present on the same picture surface as the first display picture surface and is different from the first display picture surface.

The foregoing and other objects and features of the present invention will become more apparent from the following detailed description of the preferred embodiments taken in connection with the accompanying drawings.

BRIEF DESCRIPTION OF THE DRAWINGS

FIG. 4 is a block diagram showing the schematic configuration of an image display apparatus according to a second embodiment of the present invention;

DETAILED DESCRIPTION OF THE PREFERRED EMBODIMENTS

The present invention will now be explained with reference to preferred embodiments of the invention.

Figure 2:
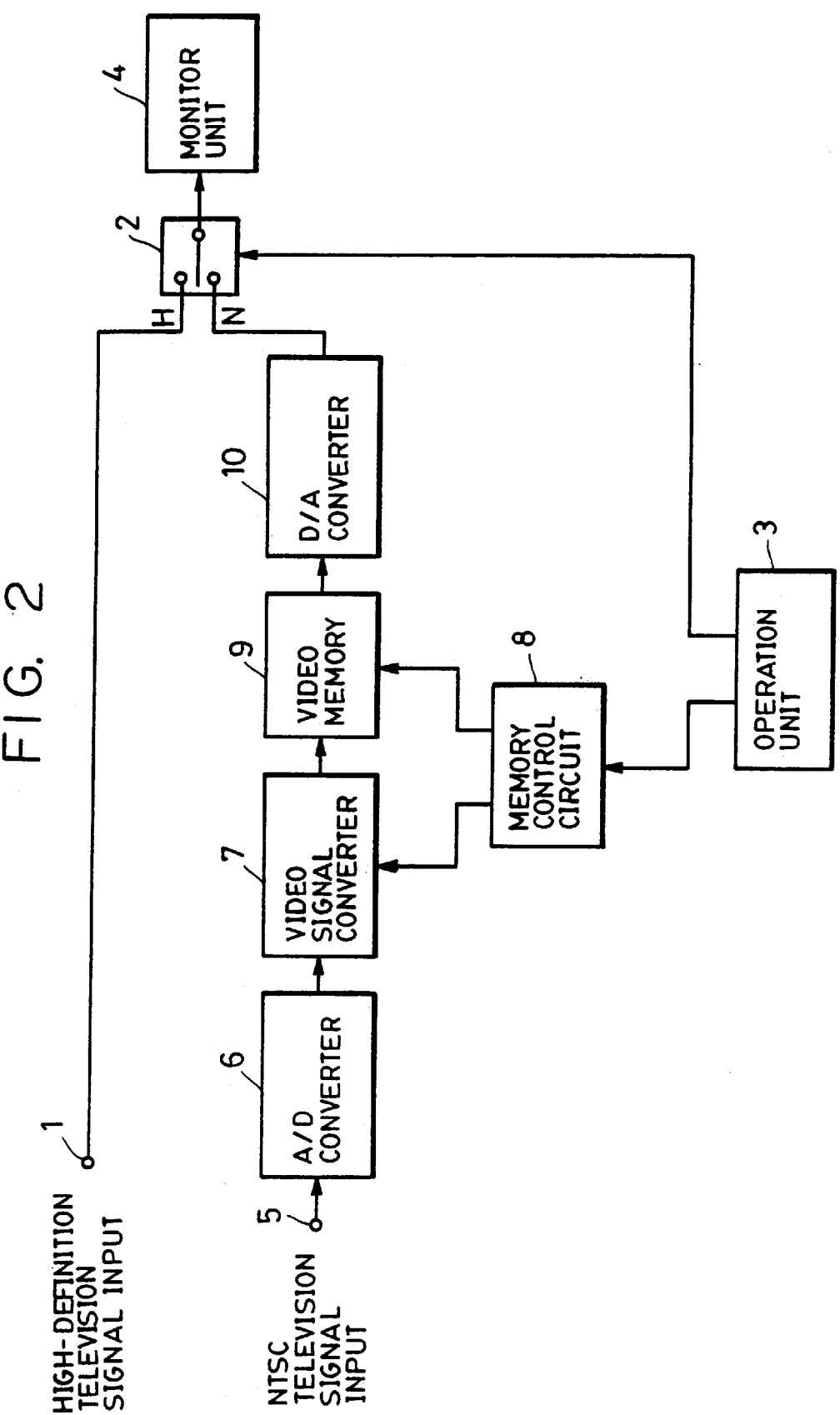
FIG. 2 is a block diagram showing the schematic configuration of an image display apparatus according to a first embodiment of the present invention.

FIG. 2 is a block diagram showing the schematic configuration of an image display apparatus according to a first embodiment of the present invention.

In FIG. 2, a high-definition television signal and an NTSC television signal are input to input terminals 1 and 5, respectively.

By operating an operation unit 3, the operator connects a switch 2 to side H (high definition signal) when displaying an image of the high-definition television signal on a monitor unit 4, and connects the switch 2 to side N (NTSC signal) when displaying an image of the NTSC television signal.

When displaying the image of the high-definition television signal, the high-definition television signal is directly supplied to the monitor unit 4 via thee switch 2, and the high-definition television image is displayed on the monitor unit 4.

The display operation of an NTSC television image in the present embodiment will now be explained.

Figure 5:
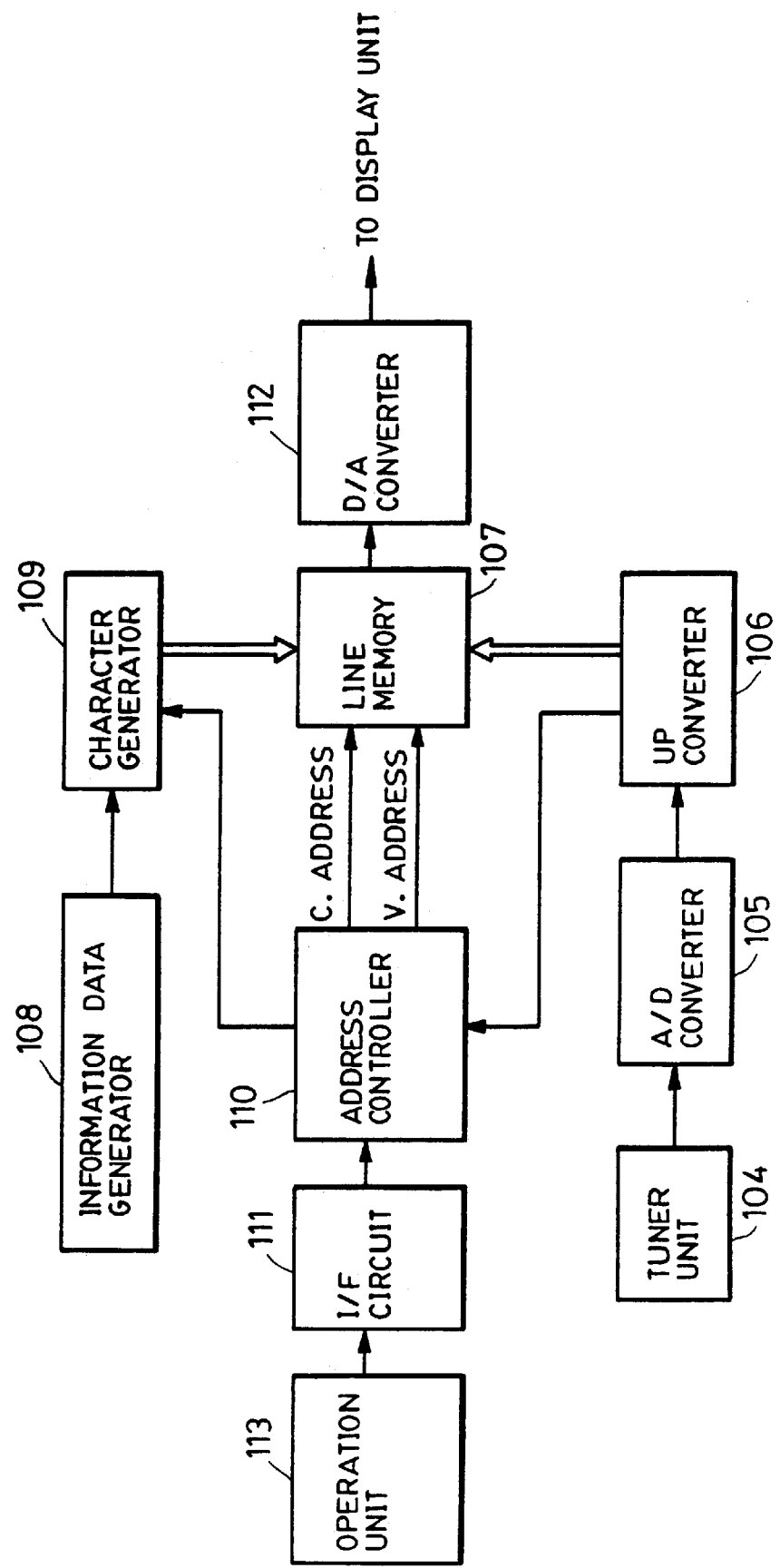
FIG. 5 is a block diagram showing the schematic configuration of an image display apparatus according to a third embodiment of the present invention.
Figure 7:
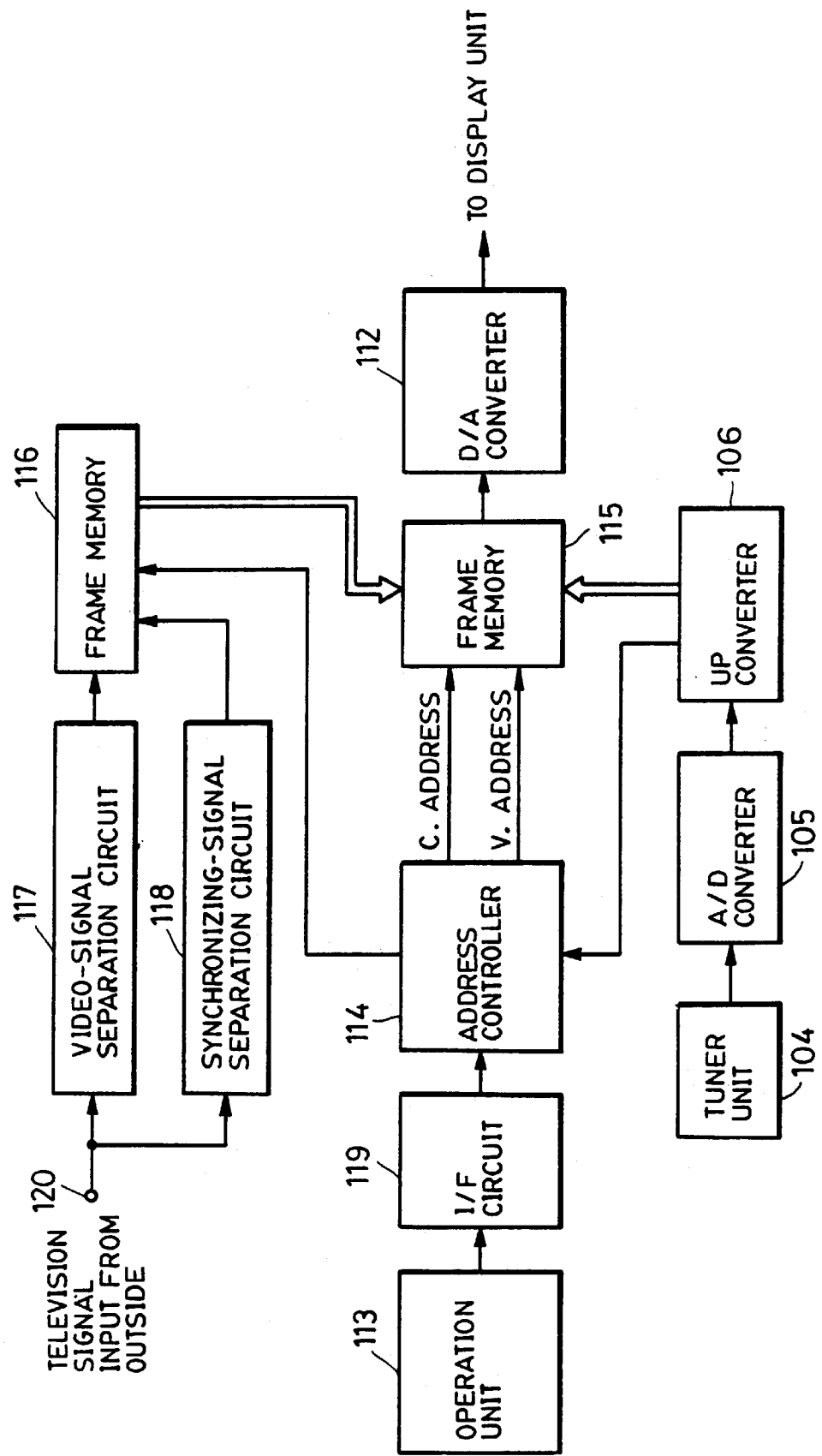
FIG. 7 is a block diagram showing the schematic configuration of an image display apparatus according to a fourth embodiment of the present invention.

Each of the elements shown in block outline in FIG. 2, as well as in FIGS. 4, 5 and 7, is well known per se and its specific type pr construction is not critical to carrying out the invention or for disclosure of the best mode for carrying out the invention.

In FIG. 2, by operating the operation unit 3, the operator connects the switch 2 to side N when displaying the NTSC television image on the monitor unit 4.

The NTSC television signal input to the input terminal 5 is converted into a digital signal by an A/D converter 6, and the converted signal is supplied to a video signal converter 7.

In order to conform the horizontal scanning period of the digitized NTSC television signal output from the A/D converter 6 to a high-definition television signal, the video signal converter 7 performs expansion processing by interpolation, and supplies a video memory 9 with the resultant signal.

A synchronizing signal corresponding to the high-definition television signal is supplied from a memory control circuit 8 to the video signal converter 7, which performs the above-described expansion processing in accordance with the synchronizing signal output from the memory control circuit 8.

The television signal subjected to the above-described expansion processing for the horizontal scanning period by the video signal converter 7 is first stored in the video memory 9, which performs interpolation processing in order to expand the television signal in the vertical direction in accordance with the expansion processing for the horizontal scanning period of the television signal performed by the video signal converter 7.

If the television signal subjected to the above-described expansion processing in the vertical direction by the video memory 9 is displayed on the monitor unit 4 as it is, part of the picture frame in the vertical direction corresponding to the television signal cannot be displayed due to the aspect ratio of the high-definition television signal.

In order to solve such a problem, by operating the operation unit 3, the operator indicates the display position of the picture frame corresponding to the television signal on the monitor unit 4 to the memory control circuit 8, which assigns a read address corresponding to the display position indicated by the operation unit 3 to the video memory 9. Image data stored in the assigned address in the video memory 9 are read, and are supplied to a D/A converter 10.

The D/A converter 10 converts the image data supplied from the video memory 9 into analog data, and supplies the converted data to the monitor unit 4 via the switch 2 connected to side N. Thus, an image subjected to expansion processing is displayed on the display picture surface of the monitor unit 4, as shown in FIG. 3.

Figure 1:
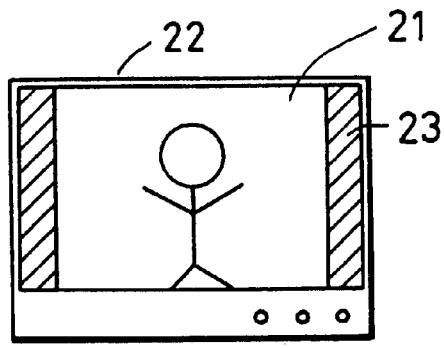
FIG. 1 illustrates a display picture surface of a conventional image display apparatus.
Figure 3:
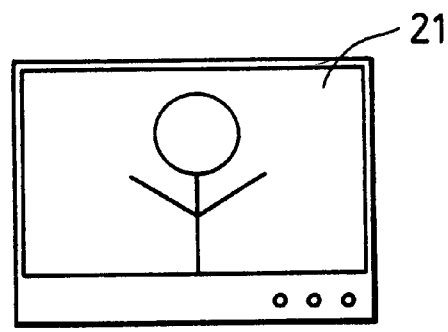
FIG. 3 illustrates a display picture surface of the image display apparatus shown in FIG. 2.

As shown in FIG. 3, by performing the above-described processing, a blank portion which has previously been present when displaying an image corresponding to an NTSC television signal on a monitor apparatus conforming to a high-definition television signal is not present, and it becomes therefore possible to effectively utilize the display picture surface of the television monitor apparatus.

A second embodiment of the present invention will now be explained with reference to FIG. 4.

In FIG. 4, like components as those in the FIG. 2 embodiment are indicated by like numerals, and a detailed explanation thereof will be omitted.

In FIG. 4, by operating an operation unit 11, the operator connects the switch 2 to side N when displaying an NTSC television image on the monitor unit 4.

An NTSC television signal input to the input terminal 5 is converted into a digital signal by the A/D converter 6, and the converted signal is supplied to the video signal converter 7 and a motion detecting circuit 12.

In order to conform the horizontal scanning period of the digitized NTSC television signal output from the A/D converter 6 to a high-definition television signal, the video signal converter 7 performs expansion processing by interpolation, and supplies the video memory 9 with the resultant signal.

A synchronizing signal corresponding to the high-definition television signal is supplied from a memory control circuit 13 to the video signal converter 7, which performs the above-described expansion processing in accordance with the synchronizing signal output from the memory control circuit 13.

The television signal subjected to the above-described expansion processing for the horizontal scanning period by the video signal converter 7 is first stored in the video memory 9, which performs interpolation processing in order to expand the television signal in the vertical direction in accordance with the expansion processing for the horizontal scanning period of the television signal performed by the video signal converter 7.

In the FIG. 2 embodiment, by assigning the display position of the picture frame corresponding to the television signal on the monitor unit to the memory control circuit using the operation unit, assigned image data are read from among image data stored in the video memory, and are displayed on the monitor unit. In the FIG. 4 embodiment, however, the read address of image data stored in the video memory 9 is controlled so that an image portion having the largest motion on the picture frame is displayed near the center of the picture surface of the monitor unit 4.

That is, the digitized television signal output from the A/D converter 6 is supplied to the motion detecting circuit 12, which compares the picture frame represented by the supplied digital television signal with the precedent picture frame, detects a portion having the largest motion on the supplied picture frame, and outputs a detection signal to the memory control circuit 13.

The memory control circuit 13 assigns a read address so that image data assigned by the detection signal supplied from the motion detecting circuit 12 are situated near the center of the display picture surface of the monitor unit 4, reads image data stored in the assigned address in the video memory 9, and supplies the D/A converter 10 with the data.

The D/A converter 10 converts the image data supplied from the video memory 9 into analog data, and supplies the monitor unit 4 with the converted data via the switch 2 connected to side N. Thus, an image is displayed on the display picture surface of the monitor unit 4 wherein all image portion having the largest motion is situated near the center of the picture surface.

As described above, in the FIG. 4 embodiment, it becomes possible to display an image so that an image portion having the largest motion is situated near the center of the display picture surface of the monitor apparatus in accordance with the motion of the image.

As explained above, according to the first and second embodiments, it becomes possible to display an image in a manner easy to observe, and to effectively utilize the display picture surface.

Figure 6:
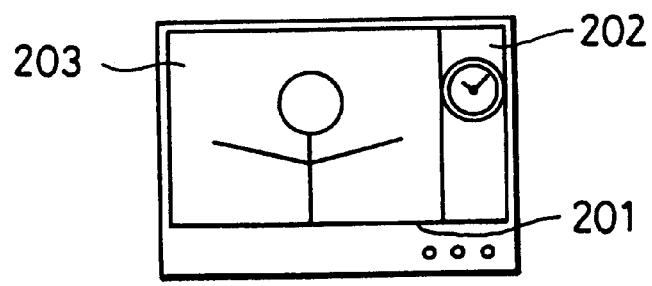
FIG. 6 illustrates a display picture surface of the image display apparatus shown in FIG. 5.

FIG. 5 is a block diagram showing the schematic configuration of an image display apparatus according to a third embodiment of the present invention. FIG. 6 shows a display example on the display unit of the image display apparatus shown in FIG. 5.

In FIG. 5, a tuner unit 104 generates NTSC television signals. An A/D converter 105 converts an analog signal into a digital signal. An up converter 106 converts the television signal digitized by the A/D converter 105 from an NTSC television signal into a television signal of a high definition system. A line memory 107 stores digital television signals from the up converter 106, and the like. An information data generator 108 generates information data, such as time, the date and the like. A character generator 109 generates display data corresponding to the information data supplied from the information data generator 108 and display data corresponding to information other than the above-described time and date. An address controller 110 controls the write positions of digital television signals supplied from the up converter 106 to the line memory 107, and the write positions of display data supplied from the character generator 109. An I/F (interface) circuit 111 converts assigned data from an operation unit 113 having switches, variable resistors, joy sticks and the like into control data for controlling the address controller 110. A D/A converter 112 converts a digital signal output from the line memory 107 into an analog signal, and outputs the converted signal to a display unit (not shown).

In the configuration shown in FIG. 5, an NTSC television signal generated from the tuner unit 104 is supplied to the A/D converter 105, and is converted from an analog television signal into a digital television signal by the A/D converter 105. The digital television signal is converted into a high-definition television signal by the up converter 106. The up converter 106 supplies the address controller 110 with a horizontal synchronizing signal synchronized with the digital television signal for one line output from the up converter 106.

The information data, such as time, the date and the like, (the information data, such as the month, day, hour, minute, second and the like) generated from the information data generator 108 are input to the character generator 109. After the digital television signal for one line has been supplied from the up converter 106 to the line memory 107 in accordance with the horizonal synchronized signal supplied from the up converter 106, the character generator 109 generates a character signal representing time and the date corresponding to the digital television signal.

By operating the operation unit 113 having the switches, variable resistors, joy sticks and the like, assigning data for assigning the display position of an image, the display position of information, and the like on the display unit are converted into control data for controlling the address controller 110 by the I/F circuit 111, and the converted data are input to the address controller 110. The address controller 110 controls the write address of the digital television signal supplied from the up converter 106 in the line memory 107 in accordance with the control data from the I/F circuit 111. That is, in order to store the digital television signal in the line memory 107 making the address corresponding to the display position of the image assigned by the assigning data supplied from the operation unit 113 a leading write address, and to store the character signal generated from the character generator 109 in addresses from the address next to the final write address for the digital television signal output from the up converter 106 and stored in the line memory 107 until the final write address of the line memory 107, the address controller 110 generates control data for controlling the write address of the line memory 107 when writing the digital television signal and the character signal in the line memory 107. The line memory 107 sequentially writes respective signals in accordance with the control data generated from the address controller 110.

After the storage operation of the line memory 107 has been completed as described above, the stored signals are sequentially read from the leading address of the line memory 107, converted from digital signals into analog signals by the D/A converter 112, and output to and displayed on the display unit. Thus, on a display unit 201 of a high definition image display apparatus as shown in FIG. 6, it becomes possible to perform a display corresponding to other information (for example, a clock or the like) on a blank portion 202 in addition to the display (reference numeral 203) of the television image.

Although, in the present embodiment, a display corresponding to time is performed as information other than the television image, an image corresponding to a television signal generated from a TV camera in a systems such as a door interphone, a TV telephone or the like, may also be displayed as other information.

FIG. 7 is a block diagram showing the configuration of an image display apparatus according to a fourth embodiment of the present invention. In FIG. 7, like components as those shown in the FIGS. 5 and 6 embodiments are indicated by like numerals, and a detailed explanation thereof will be omitted.

In FIG. 7, a frame memory 115 stores digital television signals supplied from the up converter 106. An address controller 114 controls the write positions of digital television signals supplied from the up converter 106, the reading operation of image data stored in a frame memory 116 (to be desribed later), and the writing operation of the read image data in the frame memory 115.

A video-signal separation circuit 117 separates a video-signal portion from a television signal generated from a TV camera in a system, such as a TV telephone, a door interphone or the like, input via input terminal 120. A synchronizing-signal separation circuit 118 separates a synchronizing-signal portion from the television signal input via the input terminal 120. The frame memory 116 digitizes the video signal separated from the television signal by the video-signal separation circuit 117 in synchronization with the synchronizing signal separated by the synchronizing-signal separation circuit 118, and stores the digitized signal.

In the configuration shown in FIG. 7, the NTSC television signal generated by the tuner unit 104 is supplied to the A/D converter 105, and is converted from an analog television signal into a digital television signal by the A/D converter 105. The digital television signal is converted into a high-definition television signal by the up converter 106. The up converter 106 supplies the address controller 114 with a horizontal synchronizing signal synchronized with the digital television signal for one line output from the up converter 106.

The television signal generated from the TV camera in a system, such as a TV telephone, a door interphone or the like, is input to input terminal 120. The video-signal separation circuit 117 separates a video-signal portion from the television signal, and the synchronizing-signal separation circuit 118 separates a synchronizing-signal portion from the television signal. The video signal separated by the video-signal separation circuit 117 is digitized in synchronization with the synchronizing signal separated by the synchronizing-signal separation circuit 118, and the digitized signal is stored in the frame memory 116.

By operating the operation unit 113 having the switches and the like, assigning data for assigning the display position of an image on a display unit (not shown) and the display position of information, and the like are converted into control data for controlling the address controller 114 by an I/F circuit 119, and the converted data are input to the address controller 114. The address controller 114 controls the write address of the digital television signal supplied from the up converter 106 in the frame memory 115 in accordance with the control data from the I/F circuit 119. That is, the digital television signal is stored in the frame memory 115 making the address corresponding to the display position of the image assigned by the assigning data supplied from the operation unit 113 a leading write address. Image data stored in the frame memory 116 are read in accordance with a command from the address controller 114, and are written in the frame memory 115 in a portion where the digital television signal supplied from the up converter 106 is not stored. After the above-described storage operation of the frame memory 115 by the address controller 114 has been completed, the stored signals are sequentially read from the leading address of the frame memory 115, are converted from digital signals into analog signals by the D/A converter 112, and the converted signals are output to and displayed on the display unit. Thus, it becomes possible to perform a display corresponding to another image on a blank portion in addition to the display of the television image on the display unit of the high definition image display apparatus. It is also possible to display an image signal as an image wherein a shorter side of the image substantially coincides with a shorter side of the display of the television image on the display unit.

As explained above, according to the present embodiment, an image obtained by up-converting a television signal of the NTSC system or the like into a high-definition television signal is moved within the picture surface of the display unit, and an image corresponding to a television signal generated from a TV camera in a system, such as a door interphone, a TV telephone or the like, other than the above-described television signal is displayed on a blank portion on the picture surface which is produced due to a difference in the aspect ratio between the NTSC television system and the high definition television system. Hence, it is possible to effectively utilize the blank portion on the display unit of the image display apparatus. Furthermore, by displaying an image corresponding to a television signal other than the television signal obtained by up-converting the NTSC television signal into the high-definition television signal on the blank portion, it is possible to display another image without losing part of the image obtained by the up-conversion.

What is claimed is:

1. An image display apparatus for displaying an image corresponding to an image signal, comprising:

an image display unit for displaying an image of a predetermined aspect ratio;

first image signal output means for outputting a first image signal;

second image signal output means for outputting a second image signal indicating a different kind of image from that indicated by the first image signal outputted by said first image signal output means;

image signal forming means for forming a converted first image signal having an aspect ratio different from the first image signal outputted by said first image signal output means;

storage means for storing the image signal and supplying the stored image signal to said image display unit, said storage means comprising a storage area having a storage capacity corresponding to an image signal displayed by said image display unit, and further said storage area comprising a first storage area for storing the second image signal and a second storage area for storing the converted first image signal;

display area assigning means for assigning a display area of the converted first image signal on a screen of said image display unit; and control means for controlling a storage operation of the converted first image signal with respect to said second storage area in accordance with the assignment by said display area assigning means.

2. An image display apparatus according to claim 1, wherein said control means is arranged so that the converted first image signal formed by said image signal forming means should be stored in the second storage area of said storage means corresponding to the display area assigned by said display area assigning means.

3. An image display apparatus according to claim 1, wherein said storage means includes a frame memory capable of storing a frame image signal.

4. An image display apparatus according to claim 1, wherein said image display unit includes a screen of the aspect ratio of 16 to 9.

5. An image display apparatus according to claim 1, wherein said first signal output means includes an image signal receiver for receiving the first image signal and outputting the received first image signal.

6. An image signal processing apparatus for processing an image signal so as to display the image signal on an image display unit having a screen of a predetermined aspect ratio, said apparatus comprising:

first image signal output means for outputting a first image signal;

second image signal output means for outputting a second image signal different from the first image signal;

image signal forming means for forming a converted first image signal having an aspect ratio different from the first image signal the basis of the first image signal outputted by said first;

storage means for storing the image signal, said storage means comprising a storage area having a storage capacity corresponding to an image signal displayed on the image display unit, and further said storage area comprising a first storage area for storing the second image signal and a second storage area for storing the converted first image signal;

display area assigning means for assigning a display area of the converted first image signal on the screen of the display unit; and control means for controlling a storage operation of the converted first image signal with respect to the second storage area in accordance with the assignment by said display area assigning means.

7. An image signal processing apparatus according to claim 6, wherein said control means is arranged so that the converted first image signal formed by said image signal forming means should be stored in the second storage area of said storage means corresponding to the display area assigned by said display area assigning means.

8. An image signal processing apparatus according to claim 6, wherein said storage means includes a frame memory capable of storing a frame image signal.

9. An image signal processing apparatus according to claim 6, wherein said image display unit includes a screen with an aspect ratio of 16 to 9.

10. An image signal processing apparatus according to claim 6, wherein said first signal output means includes an image signal receiver for receiving the first image signal and outputting the received first image signal.

11. An image signal processing apparatus according to claim 6, wherein said storage means is arranged so that an image signal stored in said storage area is read out and supplied to said image display unit.

12. An image signal processing method for processing an image signal so as to display the image signal on an image display unit having a screen of a predetermined aspect ratio, said method comprising the steps of:

inputting a first image signal;

inputting a second image signal different from the first image signal;

forming a converted first image signal having an aspect ratio different from the first image signal;

assigning a display area of the converted first image signal on the screen of the display unit; and storing the second image signal in a first storage area of a storage area having a storage capacity corresponding to an image signal displayed on the image display unit, and storing the converted first image signal in a second storage area in accordance with assignment in the storage area in said display area assigning step.

13. An image signal processing method according to claim 12, further comprising the step of supplying an image signal stored in the storage area in said storing step.

14. An image signal processing method according to claim 12, wherein the storage area is a frame memory capable of storing a frame image signal.

15. An image signal processing method according to claim 12, further comprising the step of displaying the stored image signal on the screen of the display unit with an aspect ratio of 16 to 9.

16. An image signal processing method according to claim 12, wherein the first image signal outputted by an image signal receiver is inputted in said first image signal inputting step.

17. An image signal processing apparatus for processing an image signal so as to display the image on a display unit having a screen of a predetermined aspect ratio and displaying an image signal of a first television system, said apparatus comprising:

a) first input means for inputting a first image signal of a second television system;

b) second input means for inputting a second image signal;

c) forming means for converting the first image signal to the image signal of the first television system so as to display the first image signal on the display unit;

d) display area assigning means for assigning a display area of the converted first image signal on the screen of the display unit; and e) storage means for storing the converted image signal in a first storage area in accordance with the output of said display area assigning means and storing the second image signal in a second storage area, said storage means being capable of storing an image signal displayed on the screen of the display unit and being arranged so that the image signal stored in a storage area is read out and supplied to the display unit.

18. An apparatus according to claim 17, wherein said storage means includes memory capable of storing a frame image signal.

19. An apparatus according to claim 17, wherein the second image signal is an image indicating time information.

20. An apparatus according to claim 17, wherein the aspect ratio of the first image signal input by said input means is different from the predetermined aspect ratio.

21. An apparatus according to claim 17, further comprising the display unit.

22. An image signal processing method for processing an image signal, so as to display the image on a display unit having a screen of a predetermined aspect ratio and displaying an image signal of a first television system, said method comprising the steps of:

inputting a first image signal of a second television system;

inputting a second image signal;

converting the first image signal to the image signal of the first television system so as to display the first image signal on the display unit;

assigning a display area of the converted first image signal on the display screen of the display unit; and storing the converted image signal in a first storage area of a storage area means in accordance with the assignment in said assigning step and storing the second image signal in a second storage area of the storage means, with the storage means being capable of storing an image signal displayed on the screen of the display unit, and being arranged so that the image signal stored in the storage means is read out and supplied to the display unit.

* * * * *

UNITED STATES PATENT AND TRADEMARK OFFICE
CERTIFICATE OF CORRECTION

| | |
|---|---|
| PATENT NO. | : 6,288,751 B1 |
| APPLICATION NO. | : 08/582936 |
| DATED | : September 11, 2001 |
| INVENTOR(S) | : Toshiya Yatomi et al. |

It is certified that error appears in the above-identified patent and that said Letters Patent is hereby corrected as shown below:

TITLE PAGE, ITEM [30] FOREIGN APPLICATION PRIORITY DATA:

"Apr. 26, 1997" should read --Apr. 26, 1990--.

TITLE PAGE, ITEM [56] REFERENCES CITED:

FOREIGN PATENT DOCUMENTS, "4008080" should read --4-8080--.

COLUMN 1:

Line 37, "apparratus" should read --apparatus--.

COLUMN 2:

Line 62, "pr" should read --or--.

COLUMN 4:

Line 47, "ail" should read --an--.

COLUMN 6:

Line 27, "desribed" should read --described--.

UNITED STATES PATENT AND TRADEMARK OFFICE
CERTIFICATE OF CORRECTION

PATENT NO. : 6,288,751 B1
APPLICATION NO. : 08/582936
DATED : September 11, 2001
INVENTOR(S) : Toshiya Yatomi et al.

It is certified that error appears in the above-identified patent and that said Letters Patent is hereby corrected as shown below:

<u>COLUMN 8</u>:

Line 35, "signal the basis of the first image signal" should read --signal;--.
Line 36, "outputted by said first;" should be deleted.

Signed and Sealed this

Twenty-fourth Day of July, 2007

JON W. DUDAS
*Director of the United States Patent and Trademark Office*